United States Patent

Matsumoto

[11] Patent Number: 5,841,372
[45] Date of Patent: Nov. 24, 1998

[54] OPERATION INFORMATION INPUT DEVICE

[75] Inventor: Isao Matsumoto, Tokyo, Japan

[73] Assignee: Kabushiki Kaisha Sega Enterprises, Ltd., Tokyo, Japan

[21] Appl. No.: 708,599

[22] Filed: Sep. 5, 1996

[30] Foreign Application Priority Data

Sep. 6, 1995 [JP] Japan .................................. 7-229506

[51] Int. Cl.$^6$ .................................................. H03M 11/00
[52] U.S. Cl. ........................ 341/20; 74/471 XY; 200/6 A
[58] Field of Search ............................... 341/20; 200/6 A, 200/330, 332, 337; 345/161, 168; 74/471 XY, 532; 463/30, 37; 273/148 B

[56] References Cited

U.S. PATENT DOCUMENTS

| | | | | |
|---|---|---|---|---|
| 4,575,591 | 3/1986 | Lugaresi | .................................. | 200/6 A |
| 5,458,021 | 10/1995 | Wichelt | .................................. | 74/536 |
| 5,499,553 | 3/1996 | Schott | .................................. | 74/526 |

*Primary Examiner*—Michael Horabik
*Assistant Examiner*—Albert K. Wong
*Attorney, Agent, or Firm*—Finnegan, Henderson, Farabow, Garrett & Dunner, L.L.P.

[57] ABSTRACT

An operation information input device comprises a control panel, and a pair of joystick each of which includes a control level projecting from the control panel. The joystick converts the direction and quantity of operation of the control level to corresponding electrical signals. The control panel has a pair of openings from which the control levers project with the covers being attached in the corresponding openings. Engagement pawls of a frame engage in opposite ends of one of elongated grooves in the cover so that the frame is attached removably to the cover. The frame has an elongated slot extending in one direction. When the frame is attached to the control panel, the control lever is restricted so as to move in a single channel.

10 Claims, 8 Drawing Sheets

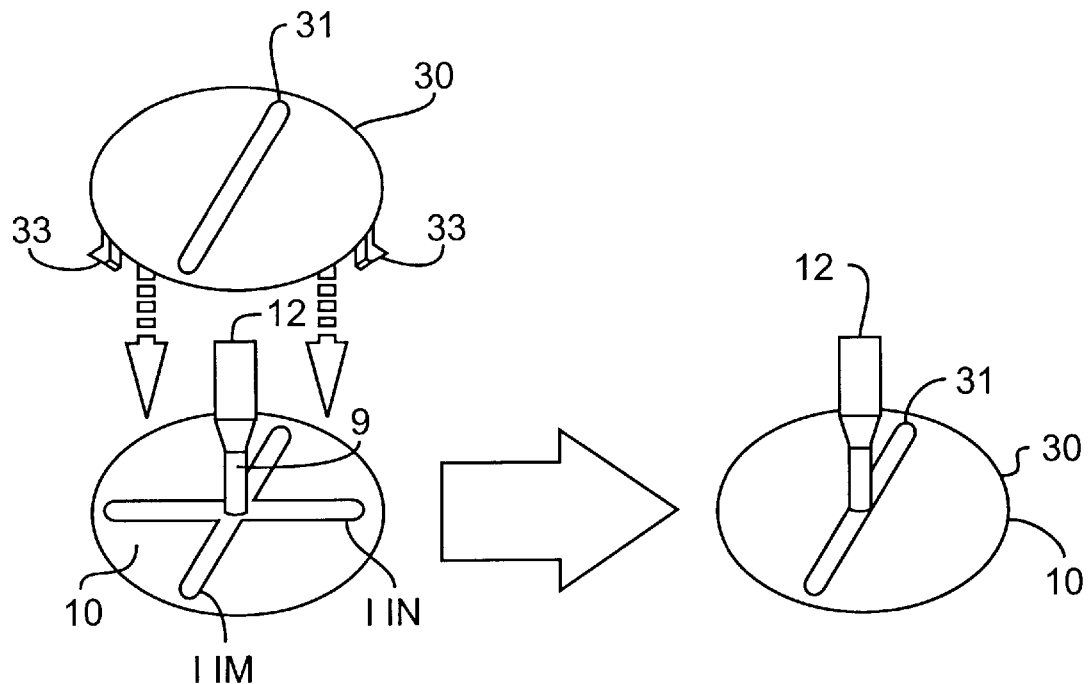
FIG. 5A  FIG. 5B
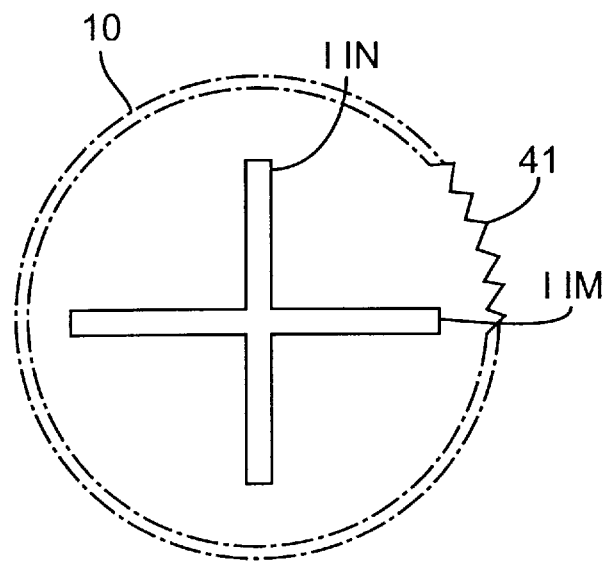
FIG. 6

OPERATION INFORMATION INPUT DEVICE

BACKGROUND OF THE INVENTION

The present invention relates to operation information input devices which give an image processor information on the operation of a control lever having a degree of freedom in at least two directions. More particularly, the present invention relates to an operation direction controlling mechanism which changes the number of channels in which the control lever is movable. Still more particularly, the present invention relates to a mechanism which changes a state in which a control lever of an operation information input device such as an analog type joystick is movable through 360 degrees to a state where the control lever is movable only in four directions, for example, back and forth and right and left. The present invention also relates to a mechanism for changing the operating directions of the control lever which has been restricted, for example, so as to move only back and forth to slant in back and forth directions.

A known typical operation input device of this type is, for example, a joystick applied to a game device. The joystick is known as an input device which gives an information processor operation information obtained by inclining in a desired direction, a control lever which has a degree of freedom in at least two directions. The joystick is of either an analog or a digital type.

In the digital type joystick, for example, the control lever is disposed on a positive z-axis, four switches in total are disposed on the corresponding positive and negative x and y axes in xyz-rectangular coordinated system where the intersection of the three axes is the origin. Thus, by way of this joystick, the switches are turned on and off by the operation of the control lever. The operation of the operation lever in any of eight directions (forward, slanting forward, backward, slanting backward, leftward, slanting leftward, rightward and slanting rightward) generates a corresponding digital signal, which is delivered to the information processor.

Since the processing ability of hardware of the conventional game device is limited, most of the ability is assigned to image processing and the remaining ability to be assigned to other processing is minimized. Thus, information to be input to the game device is desired to be minimized. For example, operation information which indicates a direction is given by a digital type joystick or joypad.

However, the state-of-the-art game device has improved the processing ability of its hardware, it has been required that the story of the game, the display screen or characters' moves in the game should be expressed finely. Thus, it has been required to provide an operation information input device which is capable of finely indicating operation information which in turn indicates a direction, etc.

One of the operation information input devices which satisfy such requirements is an analog type joystick, which gives the direction and quantity of operation of the joystick as electrical signals to the information processor. For example, it is capable of giving the information processor a position in a x and y coordinate in resistance value by operating an operation lever disposed on a positive z-axis of xyz rectangular coordinate system in which a pair of volumes and a pair of encoders are disposed on each of the positive x and y axes with the origin being at the intersection of the respective axes.

When such joystick is applied to a game device as a device which causes a sole stepping-down operation such as an accelerator used in a car game, a quantity of movement of the joystick only in one direction is required to be determined and the operation of the joystick in other directions is not required. However, from a standpoint of the structure of the joystick, the operation lever is capable of moving through a range of 360 degrees. Thus, for example, even when the player has the intention of moving the operation lever only in one direction, the movement of the operation lever in another direction generally cannot be avoided.

When such operation occurs, a quantity of the correct operation cannot be given to the game device. For example, when an object in the game is required to be moved straight depending on the moving direction of the operation lever, the object would necessarily also be moved in a different direction.

Thus, when it is required that the operation lever should be operated only in a specified direction, it is required to control the moving direction of the operation lever. To this end, it could be considered that one or more dedicated joysticks different in the number of directions (channels) in which they can be operated and moved are provided such that an appropriate joystick can be selected from among those joysticks depending on the kind of game program used. However, preparation for multiple joysticks in each game device would increase the number of components of the game device, take much time for managing the components, and above all, increase the cost.

Even a digital type joystick which has, for example, eight or four directions in which the joystick is movable can be required to be movable only in some of the directions depending on the contents of the game. Usually, since the player operates the joystick frequently, it would be preferable for the player that the direction in which the operation lever is movable should be restricted in several specified directions. Especially, in home game devices, the joystick is of a small type, so that the movement of the operation lever only in predetermined directions of a plurality of directions in which the operation lever is movable is considerably difficult.

Even if the program and hence game contents of the game device are changed when the movement of the operation lever of the joystick has been limited in several specified directions, required operation information from the joystick would be insufficient, disadvantageously. In such joystick, the direction in which the operation lever is movable depending on the game contents or the user's preference cannot be changed.

It is therefore an object of the present invention to provide an operation information input device which is capable of easily changing the number of channels in the directions in which the operation lever is movable.

Another object of the present invention is to provide an operation information input device which is capable of changing to any direction the direction in which the operation lever is operable.

A further object of the present invention to provide an information processor such as, for example, a video game device having such operation information input device.

SUMMARY OF THE INVENTION

In order to achieve the first object, the inventive operation information input device comprises a control panel, a control lever which projects outward from the front of the control panel, a frame in which the control lever is movable in a desired direction, an attaching mechanism which attaches the frame removably to the control panel.

In order to achieve the second object, the attaching mechanism attaches the frame to the control panel so as to be rotatable relative to the control panel.

Preferably, the inventive operation input device comprises a plurality of such frames each of which has a different number of channels in which the control lever is movable such that a frame having the number of channels suitable for the content of image processing performed on the input information in an information processor is selectable from the plurality of frames.

According to the present invention, the attaching mechanism is capable of attaching a frame removable to the control panel. Thus, a frame having a number of channels for the control lever can easily be replaced with a frame having another selected desired number of channels.

According to the attaching mechanism, the frame is attachable rotatably to the control panel, so that the angle through which the control lever moves relative to the control panel is freely changeable.

BRIEF DESCRIPTION OF THE DRAWINGS

FIGS. 5A and 5B illustrate a process for assembling the attaching mechanism;

FIG. 6 is a plan view of a second example of a frame used in a second attaching mechanism;

DESCRIPTION OF THE PREFERRED EMBODIMENT

A first embodiment of an operation input device according to the present invention will be described with reference to FIGS. 1–5. An operation unit 1 is provided with a control panel 3 fixed to a housing 2. Two control levers 9R and 9L are disposed so as to be horizontally symmetrical with reference to each other on the front of the control panel 3. Two groups of three buttons 6a–6c and 7c–7z are provided near the corresponding control levers 9R and 9L to input information to a game device (information processor) body (not shown). Each group of buttons can output different data. For example, each group of buttons designates larger, middle and smaller punch and kick forces in a game where two game fighters do combat with each other. A start button 8 which outputs game start information to the game body is provided between the two groups of buttons. The control lever 9R and 9L are freely movable in the respective determined strokes.

The control panel 3 is provided with right and left circular openings in which corresponding covers 10R and 10L are fitted as frames. The covers 10R and 10L have elongated crossing slots or channels 11RN and 11RM and 11LM and 11LN, respectively. Control levers 9R and 9L project from the corresponding centers in the crossing slots.

The slots 11R and 11L in the covers 10R and 10L determine the directions in which the control levers move. The crossing slots in each cover allow the control lever to move in the corresponding crossing directions. Knobs 12R and 12L are provided at ends of the control levers 9R and 9L, respectively. The covers are attached beforehand to the control panel 3.

Figure 1:
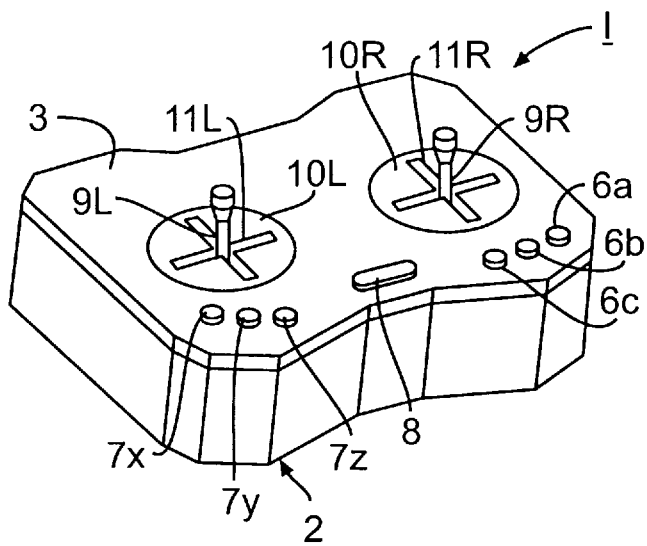
FIG. 1 is a perspective view of an embodiment of an operation information input device according to the present invention.
Figure 2:
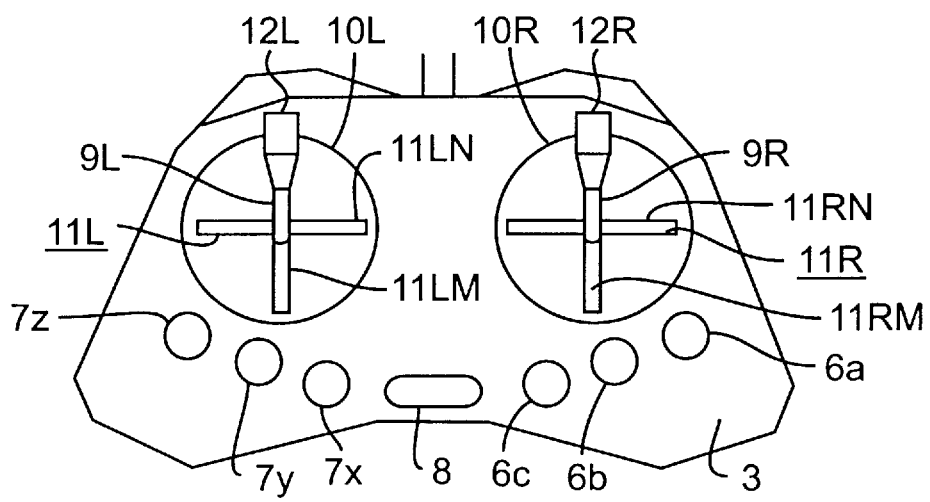
FIG. 2 is a plan view of the embodiment.
Figure 3:
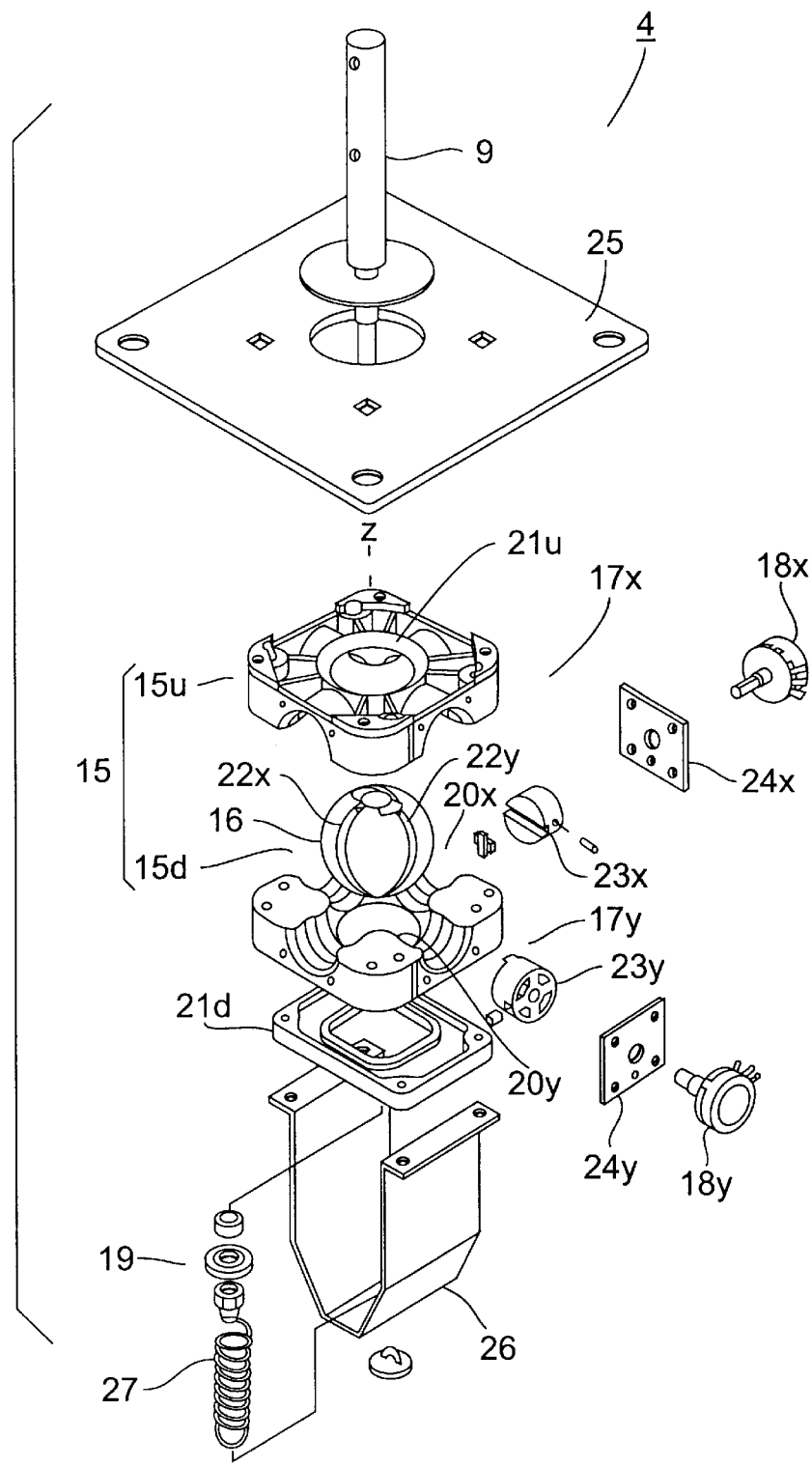
FIG. 3 is an exploded perspective view of one example of a driving mechanism for a control lever used in the embodiment.

In the present embodiment, any one of the conventional mechanisms which move the control levers may be used. FIG. 3 shows one example of such mechanisms, for example a joystick (input device), in an exploded perspective view.

The joystick 4 is provided with a container 15, a ball 16 accommodated in the container 15, a control lever 9 inserted into a bore extending along a center line z of the ball 16, rotation converters 17x and 17y which converts the movement of the control lever 9 to the respective rotations of the x and y axes on the basis of the movement of the ball 16, rotation-to-electrical signal converters 18x and 18y which convert the movements of the rotation converters 17x and 17y to electrical signals, and returning means 19 for returning the ball 16 at all times to a predetermined position.

The ball container 15 is composed of upper and lower separable halves 15u and 15d. The ball container 15 has horizontal holes 20x and 20y intersecting at right angles and formed by the cooperating upper and lower halves 15u and 15d. The upper and lower container halves 15u and 15d have aligning through holes 21u and 21d, respectively, having a predetermined radius and through which the control lever 9 is inserted into the ball 16 from above.

Two circular peripheral grooves 22x and 22y are provided intersecting at right angles on the center line z on the surface of the ball 16 to cause engagement elements 23x and 23y accommodated in the holes 20x and 20y, respectively, to be engaged therein. The engagement elements 23x and 23y are connected to the rotation position-electrical signal converters 18x and 18y, respectively, which may be, for example, composed of a variable resister or a rotary encoder. The rotation converters 17x and 17y are composed of the grooves 22x and 22y on the ball 16, the holes 20x and 20y and corresponding engagement elements 23x and 23y, respectively. The rotation position-electrical signal converters 18x and 18y are fixed to fixing plates 24x and 24y, respectively. The ball container 15 is fixed to a fixing plate 25 used for attachment to the control panel 3, for example.

Provided below the lower container half 15d is a U-like spring holder 26 in which a coil spring 27 is provided. The coil spring 27 is fixed at one end to the bottom of the holder 26 and at the other end to the ball 16 at its lowest point on the center axis x of the ball 16. Thus, the center line of the ball 16 is at all times in a predetermined direction and the control lever 9 operates to come to a neutral position at all times. The returning means 19 is composed of the spring holder 26 and the coil spring 27.

Since the joystick 4 is well known and its operation will be outlined, the player moves the control lever 9 manually back and forth and right and left to thereby obtain an electrical signal which designates a position in the xy rectangular coordinate system. When the control lever 9 is moved, the ball 16 rotates within the container 16 in the moving direction of the control lever 9. In response to this operation, the positional relationship between the grooves 22x and 22y on the ball 16 and the engagement elements 23x, 23y which engage the grooves 22x, 22y, respectively, changes, which causes rotations of the engagement elements 23x and 23y. These rotations are given to the rotation position-electrical signal converters 18x and 18y composed, for example, of variable resisters, which then output resistance values depending on the rotational positions of the engagement elements 23x and 23y to thereby allow the player to know the direction and quantity of movement of the control lever.

Figure 4:
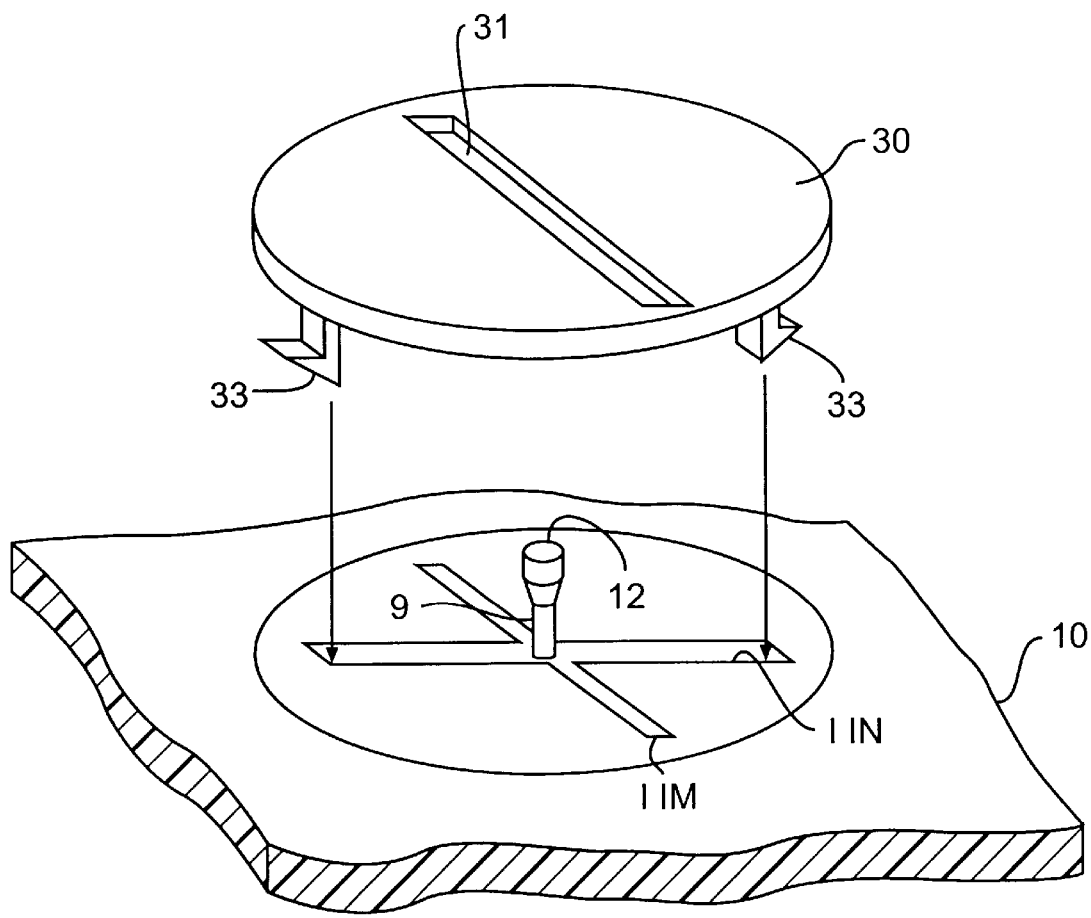
FIG. 4 is a perspective view of one example of an attaching mechanism used in the embodiment.

FIG. 4 illustrates an attaching mechanism for a frame. A cover 30 as a new frame has an elongated slot (channel) 31 extending along a diameter thereof. The frame 30 has a pair of fitting mechanisms (engagement pawls) 33 elastically approachable each other, one at each of the opposite ends of a diameter of the circular frame 30 perpendicular to the extending slot 31. By engaging the pawls elastically into the corresponding opposite ends of the elongated groove in the cover 10 fixed to the control panel 10, the new frame 30 is attached removably to the control panel from above the cover 10.

FIG. 5 illustrates the fitting operation of the cover 30 to the control panel in more detail. First, the knob 12 is removed, for example, by unscrewing same. The cover 30 is then pressed down such that the pawls 33 engage the opposite ends of the elongated slot 11N in the cover 10 (see FIG. 5A).

The knob 12 is then screwed again over the control lever 9 at its upper end to thereby change the number of channels in which the control lever moves, for example, from two to one, as shown in FIG. 5B.

Thus, according to this embodiment, the joystick itself is not required to be replaced with another. By attaching another frame 30 which brings about a different moving direction of the control lever removably to the control panel, the number of operating directions (channels) of the joystick is changed and hence a plurality of joysticks depending on a game device is not required to be prepared for.

While in the embodiment changing the joystick 4 for two channels to a joystick 4 for one channel has been illustrated, for example, a joystick for three channels can be changed easily to one for two channels or one channel. The joystick for one channel obtained by attaching the frame having one elongated direction slot to the control panel 3 can be changed easily to a joystick for two channels by removing that frame and fitting another frame having two different elongated direction slots instead to the control panel or can each be changed to a joystick for three channels by fitting a frame having three different elongated direction slots to the control panel.

According to the embodiment, when the cover 10 is covered with a cover having a new number of channels, the elongated slots formed already in the cover 10 may be utilized. Of course, other slots in which the engagement pawls 3 are engaged may be formed.

Figure 7:
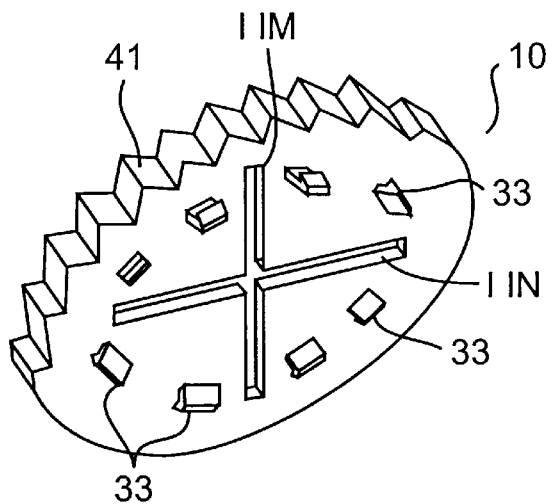
FIG. 7 is a perspective view of this frame as viewed from the bottom.

FIGS. 6–12 show a second embodiment of the present invention. FIGS. 6 and 7 illustrate a second cover 10 to be attached rotatably to the control panel. The cover 10 takes the form of a disc having a predetermined thickness with a elongated slots 11N and 11M intersecting at right angles at their center. The cover disc 10 has successive grooves 41 arranged along the outer periphery thereof. Provided on the back of the cover 10 are eight engagement pawls 33 disposed equi-distantly along the outer periphery of the cover 10 and projecting perpendicular to the cover surface. Once the pawls 33 engage an opening in the panel 3, they cannot be removed easily.

Figure 8:
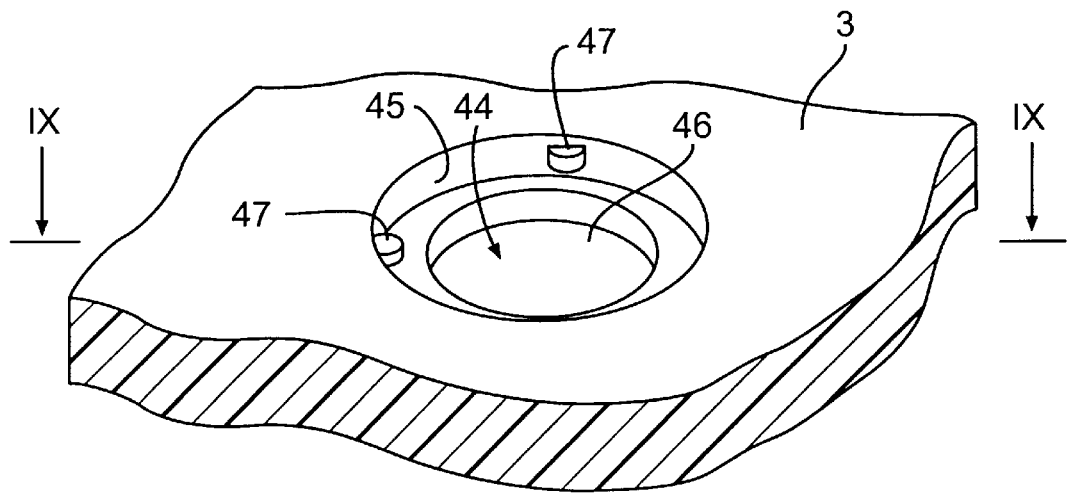
FIG. 8 is a perspective view of a control panel having an opening in which the frame of FIG. 7 is inserted.
Figure 9:
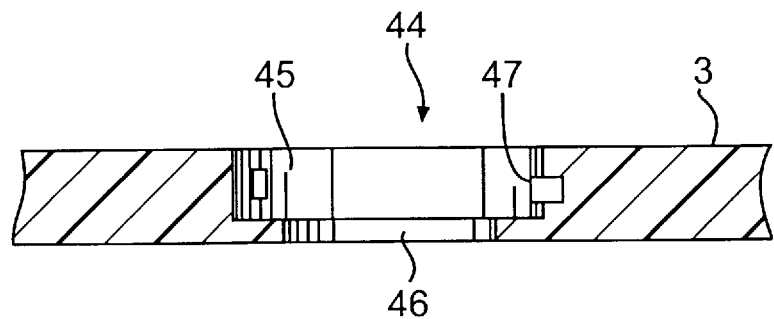
FIG. 9 is a cross-sectional view taken along the line IX—IX of FIG. 8.

FIG. 8 is a perspective view of the cover provided on the control panel. FIG. 9 is a cross-sectional view taken along the line IX—IX of FIG. 8. The opening 44 in the panel 3 has a stepped opening composed of a larger diameter sub-opening 45 and a smaller diameter sub-opening 46. Three abutting springs 47 are disposed along the inner periphery of the larger diameter sub-opening 45 at intervals of 120 degrees so as to project inward somewhat. The larger diameter sub-opening 45 has a diameter appropriate for accommodation of the cover 10 therein while the smaller diameter sub-opening 46 has a diameter appropriate for engageable accommodation of the engagement pawls 33.

Figure 10A:
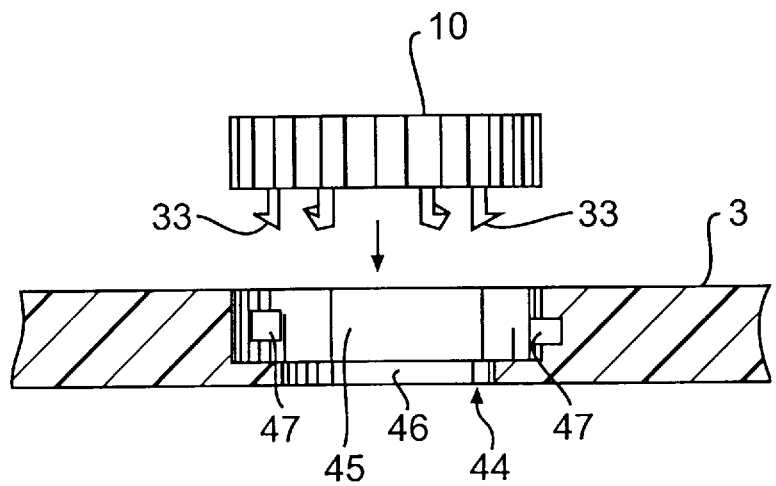
FIGS. 10A and 10B show a process for assembling the second attaching mechanism.
Figure 10B:
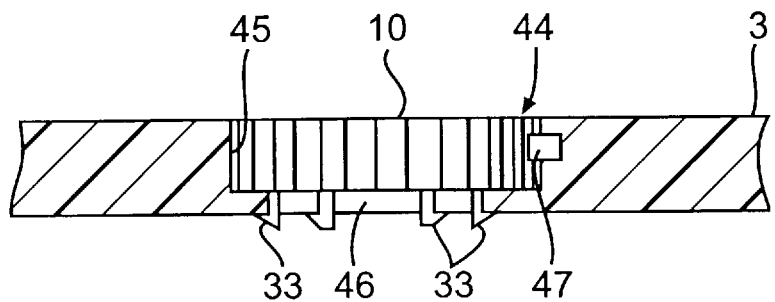
Figure 11:
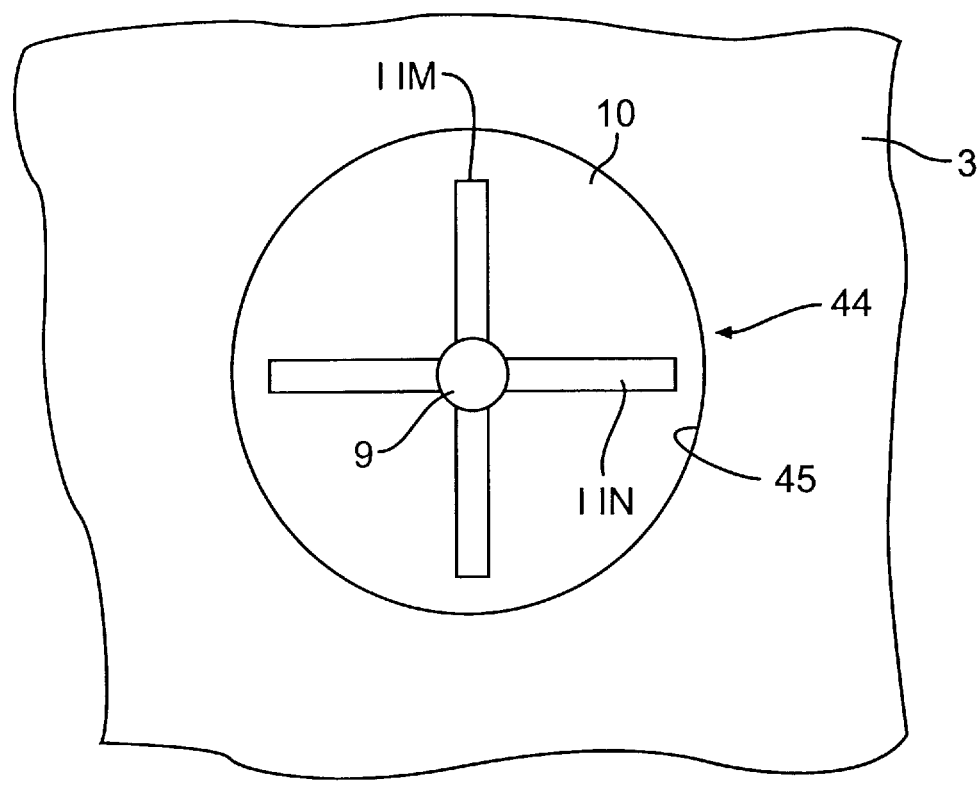
FIG. 11 is a plan view of an assembled attaching mechanism.

FIGS. 10 and 11 illustrate the fitting operation of the cover into the opening. As shown in FIGS. 10A, 10B and 11 the cover 10 is inserted into the opening 44 such that the cover body is fitted into the larger diameter sub-opening 45 and the engagement pawls 33 are accommodated and engaged in the smaller diameter opening 46 in the control panel 3 so as to be elastically biased against the inner surface of the sub-opening 46. Thus, the cover 10 which has slots which determine the moving directions of the control lever 9 is supported rotatably in the opening 44 by the fitting means (engagement pawls 33 and the inner wall of the smaller diameter sub-opening 46). The cover 10 has successive grooves 41 arranged along the outer periphery thereof in which grooves the abutting springs 47 arranged along the inner periphery of the larger diameter sub-opening 45 are engaged, so that the cover 10 does not rotate easily. When a torque larger than a predetermined one is applied to the cover 10, the abutting springs 47 engage the successive grooves with a click to maintain the state of engagement of the cover 10 with the control panel 3.

After the player applies a torque larger than a predetermined one to the cover 10 to set the extending direction of the cover slots, the rotation of the cover is restricted by the rotation restricting means including the successive peripheral grooves 41 of the cover 10 and the abutting springs 47 arranged along the inner periphery of the larger diameter opening 45. Thus, even when the control lever 9 is operated, the cover 10 does not rotate as long as the torque applied to the cover 10 is smaller than the predetermined one.

Figure 12A:
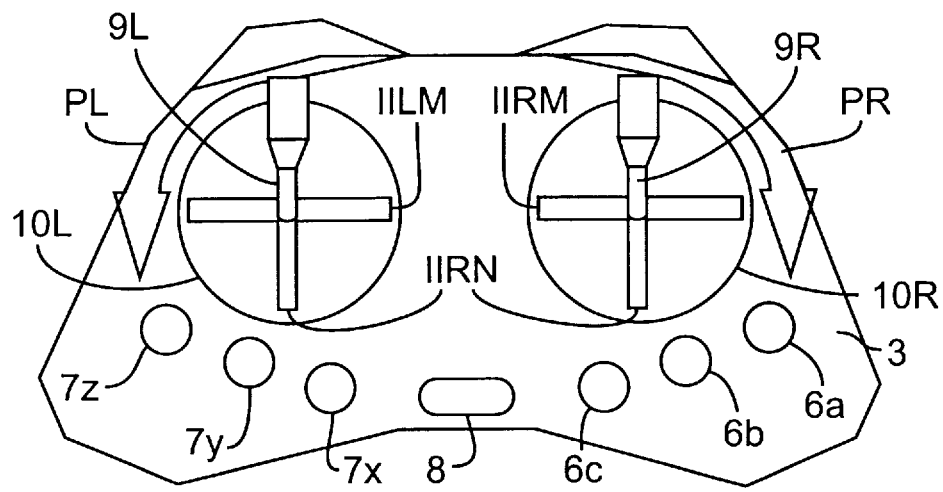
FIGS. 12A and B each show an example of a cover set at a different angle to the control panel in an operation information input device having a pair of such attaching mechanisms.

FIG. 12 illustrates the use of the cover 10. For example, as shown in FIG. 12A, assume that the crossing slots formed by the elongated slots 11N and 11M in each cover 10 have taken the corresponding positions. When the player applies torques larger than a predetermined one to the covers 10, for example by finger, in opposite directions of arrows PR and PL, the covers 10 are rotated.

Figure 12B:
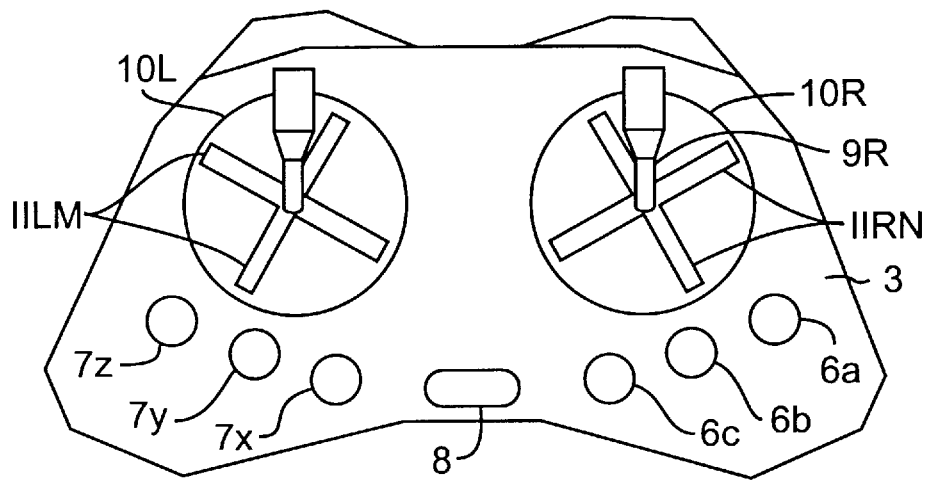

As shown in FIG. 12B, the rotations of the covers 10R and 10L are then stopped when the crossing slots 11R and 11L in the covers 10R and 10L are at required angles to their original positions to change the moving directions of the levers in desired directions. Once the covers are set at those rotational positions, the covers 10R and 10L do not easily rotate thereafter because the abutting springs 47 engage the peripheral grooves 41 on the covers 10R and 10L. Even when, for example, the control levers 9R and 9L are operated to apply torques smaller than the predetermined one to the covers 10R, 10L respectively, the covers 10R and 10L are not rotated by the applied torques, but the moving directions of the control levers 9R and 9L are maintained in the respective directions shown in FIG. 12B.

In this embodiment, the control levers 9 can be set so as to be movable in the directions which the player prefers and/or the operating directions depending on the kind of game to be played. By applying the analog type control lever 9 to the input device, the rectlinearity of car tires is increased in a driving game and control over the stability of the direction of the tires is facilitated, and furthermore, the degree of stepping down on the accelerator brake is maintained at a constant value although the digital control device cannot stabilize the direction of the tires.

The covers of FIGS. 12A and B may be exchanged with ones having another number of elongated slots. For example, when the control levers are required to be set so as to be operable in four directions in a game in which two players fight with each other or when the control levers are required to be set so as to be operable in one direction in a car race game, the frames can be replaced with others or rotated to thereby realize the operating directions of the control levers or the number of elongated channels for the control levers suitable for the game contents.

As described above, according to the present invention, an operation information input device in which the number of channels extending in the desired directions in which the control levers are movable can be changed easily is provided. In addition, a control input device is provided which is capable of changing the directions in which the control levers are operable to any directions.

What is claimed is:

1. An operation information input device comprising:
   a control panel;
   a control lever projecting outwardly from said control panel; and
   a frame having channels for limiting the movement of said control lever and being releasably and rotatably attached to said control panel.

2. An operation information input device according to claim 1, further comprising additional frames, each of said additional frames having a different number of channels for limiting the movement of said control lever.

3. An operation information input device comprising:
   a control panel;
   a control lever projecting outwardly from said control panel; and
   a frame having channels for limiting the movement of said control lever, said frame being rotatably attached to said control panel.

4. An operation information input device according to claim 3, further comprising additional frames, each of said additional frames having a different number of channels for limiting the movement of said control lever.

5. An information processor having an operation information input device comprising:
   a control panel;
   a control lever projecting outwardly from said control panel,; and
   a frame for limiting the movement of said control lever and being releasably and rotatably attached to said control panel.

6. An information processor according to claim 5, further comprising additional frames, each of said additional frames having a different number of channels for limiting the movement of said control lever.

7. An information processor having an operation information input device comprising:
   a control panel;
   a control lever projecting outwardly from said control panel;
   a plurality of frames each having a different number of channels for limiting the movement of said control lever, said frames being releasably and rotatably attached to said control panel.

8. An information processor having an operation information input device comprising:
   a control panel;
   a control lever projecting outwardly from said control panel;
   a frame defining the movement of said control lever; and
   an attaching mechanism for rotatably attaching said frame to said control panel.

9. An operation information input device comprising:
   a control panel having panel channels for guiding a control lever extending through said panel channels;
   a frame rotatably attached to said control panel and having frame channels extending therethrough and protuberances sized to engage opposite ends of one of said control panel channels for releasably attaching said frame to said control panel.

10. A method for varying the amount of input information transmitted to an information processor by an information input device, the information input device comprising a control panel having a plurality of panel channels, and a control lever projecting through said panel channels, said control lever using rotation-to-electrical signal converters for sending electrical signals to an information processor, the method comprising the steps of:
    detaching a knob releasably attached to a top portion of said control lever;
    releasably and rotatably attaching a frame to at least one of said panel channels of said control panel; and
    attaching said knob to said control lever.

* * * * *